(12) United States Patent
Norhammar et al.

(10) Patent No.: US 8,165,308 B2
(45) Date of Patent: Apr. 24, 2012

(54) ARRANGEMENT AND METHOD FOR DETERMINING OPERATIONAL MODE OF A COMMUNICATION DEVICE

(75) Inventors: Björn Norhammar, Stocksund (SE); Michael Hultman, Enskede (SE)

(73) Assignee: Sony Ericsson Mobile Communications AB, Lund (SE)

( * ) Notice: Subject to any disclaimer, the term of this patent is extended or adjusted under 35 U.S.C. 154(b) by 765 days.

(21) Appl. No.: 12/276,645

(22) Filed: Nov. 24, 2008

(65) Prior Publication Data

US 2010/0098261 A1 Apr. 22, 2010

(30) Foreign Application Priority Data

Oct. 17, 2008 (EP) .................................... 08166932

(51) Int. Cl.
*H04R 29/00* (2006.01)
(52) U.S. Cl. ......................................................... 381/59
(58) Field of Classification Search .................. 381/59
See application file for complete search history.

(56) References Cited

U.S. PATENT DOCUMENTS

| | | | | |
|---|---|---|---|---|
| 4,823,391 A * | 4/1989 | Schwartz | ....................... | 381/103 |
| 7,016,504 B1 * | 3/2006 | Shennib | ......................... | 381/60 |
| 7,092,512 B2 * | 8/2006 | Kato et al. | ................ | 379/387.01 |
| 2005/0141696 A1 * | 6/2005 | Kato et al. | ................ | 379/387.01 |
| 2006/0029234 A1 | 2/2006 | Sargaison | | |
| 2007/0297634 A1 * | 12/2007 | Hansson | ...................... | 381/384 |

FOREIGN PATENT DOCUMENTS

| | | |
|---|---|---|
| EP | 1 496 670 A1 | 1/2005 |
| EP | 1 523 218 A1 | 4/2005 |
| WO | WO 2008/000304 | 1/2008 |

OTHER PUBLICATIONS

European Search Report corresponding to European application PD54024EP00, dated Mar. 11, 2009, 9 pages.

* cited by examiner

*Primary Examiner* — A O Williams
(74) *Attorney, Agent, or Firm* — Harrity & Harrity, LLP

(57) ABSTRACT

A wireless electronic arrangement configured to connect to an earphone arrangement may include a signal generator to generate an electric signal to be sent over the earphone arrangement; a measuring arrangement to make at least one measurement of the electric signal to determine a value indicating a current acoustic impedance of the earphone arrangement; a control unit to compare the determined value with a stored value indicating an operational acoustic impedance stored on a memory unit and, based on a result of the comparison, to select an operational mode of the wireless electronic arrangement based on the determined state of the earphone arrangement.

17 Claims, 6 Drawing Sheets

ARRANGEMENT AND METHOD FOR DETERMINING OPERATIONAL MODE OF A COMMUNICATION DEVICE

TECHNICAL FIELD

The invention generally relates to a method and an arrangement in a communications network and, more particularly, to determining operational mode of an arrangement.

BACKGROUND

In the field of wireless electronic devices, there is continuously an increase in the number of applications and features to enhance the functionality of the wireless electronic devices. In order to facilitate the operation of the wireless electronic devices, earphones have been provided for enhancing the media experience, as well as to facilitate the hands-free functionality. As the earphones are plugged into the wireless electronic device, the internal back speakers are disabled and the sound is transmitted via the earphones to the user. However, whether the earphones are used or not is not determined.

SUMMARY

Embodiments of the invention disclosed herein may provide a method for enhancing the operation of a wireless electronic arrangement.

Embodiments of the invention may be directed to a wireless electronic arrangement configured to detect a state of an earphone arrangement connected to the wireless electronic arrangement so as to determine operational mode of the wireless electronic arrangement. The earphone arrangement may be enabled to be in one of at least two different states, for example, an active state and a non-active state.

The wireless electronic arrangement may include an electric signal generator configured to generate a second electric signal to be sent over the earphone arrangement.

The wireless electronic arrangement may include a measuring arrangement adapted to make at least one measurement on the second electric signal to determine a second value indicating a second acoustic impedance of the earphone arrangement.

A control unit may be included in the wireless electronic arrangement and be configured to compare the second value with a first value indicating a first acoustic impedance stored on a memory unit and based on the comparison to determine the state of the earphone arrangement.

The control unit may be configured to determine and set up operational mode of the wireless electronic arrangement based on the determined state of the earphone arrangement.

In some embodiments, a method in a wireless electronic arrangement may determine an operational mode of the wireless electronic arrangement may be provided. The wireless electronic arrangement may connect to an earphone arrangement. The earphone arrangement may be enabled to be in at least two states and active state and a non-active state. The wireless electronic arrangement may generate a second electric signal and send the second electric signal to the earphone arrangement. The second signal may be measured resulting in a measured value, and based on the measured value. a second value indicating a second impedance of the earphone arrangement may be determined.

The wireless electronic arrangement may be arranged to determine a state of the earphone arrangement based on a comparison of the determined second value compared with a first value indicating a first impedance of the earphone arrangement.

Based on the determined state of the earphone arrangement the wireless electronic arrangement may be set to an operational mode.

Embodiments are disclosed that may provide detection as to whether the earpiece is in the ear or not, and upon making that determination, set the communication device in an operation mode correspondingly, resulting in a facilitated operation of the communication device.

BRIEF DESCRIPTION OF THE DRAWINGS

Embodiments will now be described in more detail in relation to the enclosed drawings, in which.

DETAILED DESCRIPTION OF EMBODIMENTS

Figure 1A:
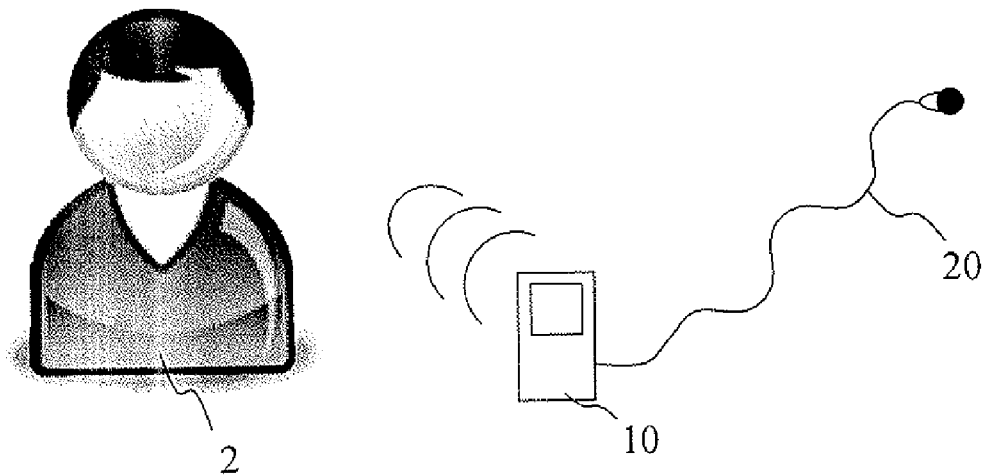
FIG. 1A discloses a schematic overview of a communication device of a user.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

The present invention is described below with reference to block diagrams and/or flowchart illustrations of methods, apparatus (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory storage device, that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any device that can contain, store, communicate, propagate, or transport the program for use by or in connection with the instruction execution system, apparatus, or device.

The present invention is described herein as employed in and with a wireless electronic arrangement. In the context of the invention, the wireless electronic arrangement may be, for example, a mobile phone, a PDA (personal digital assistant), any other type of portable computer, such as a laptop computer. It may also be an arrangement of a mobile device with a separated headset, such as a Bluetooth® headset or the like.

A control unit may be a single (central) processing unit, a plurality of processors, and or the like.

A memory unit may be a single memory unit, a plurality of memory units, for example, internal and/or external memory units, and/or any similar device.

Figure 1B:
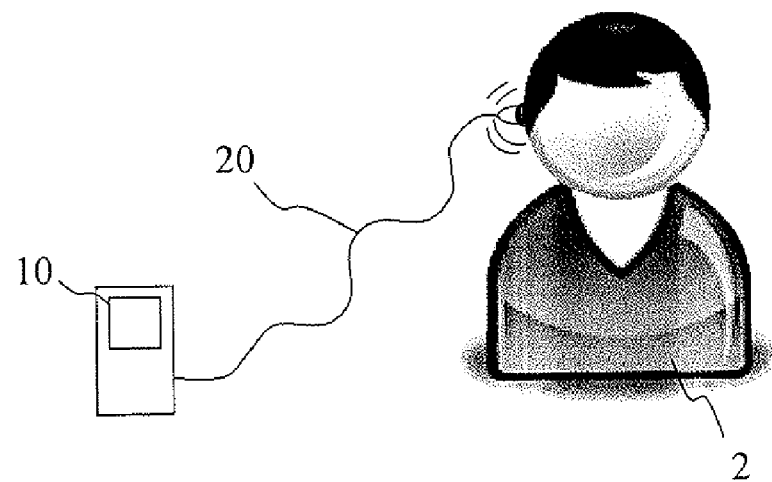
FIG. 1B shows a schematic overview of a communication device of a user.

In FIGS. 1A-1B, schematic overviews of a user 2 and a mobile device 10 are shown.

In FIG. 1A, mobile device 10 may include an earphone arrangement 20 that is not inserted into the ear of user 2. Mobile device 10 may be in an operational mode in which incoming calls generate an output signal in a speaker arrangement within mobile device 10.

In FIG. 1B, mobile device 10 may detect a change in the impedance when earphone arrangement 20 is inserted into the ear of user 2, as volume around the speaker membrane of the earphones is changed. As a result, communication device 10 may switch to another operational mode, wherein incoming calls generate an output signal in earphone arrangement 20.

Figure 2:
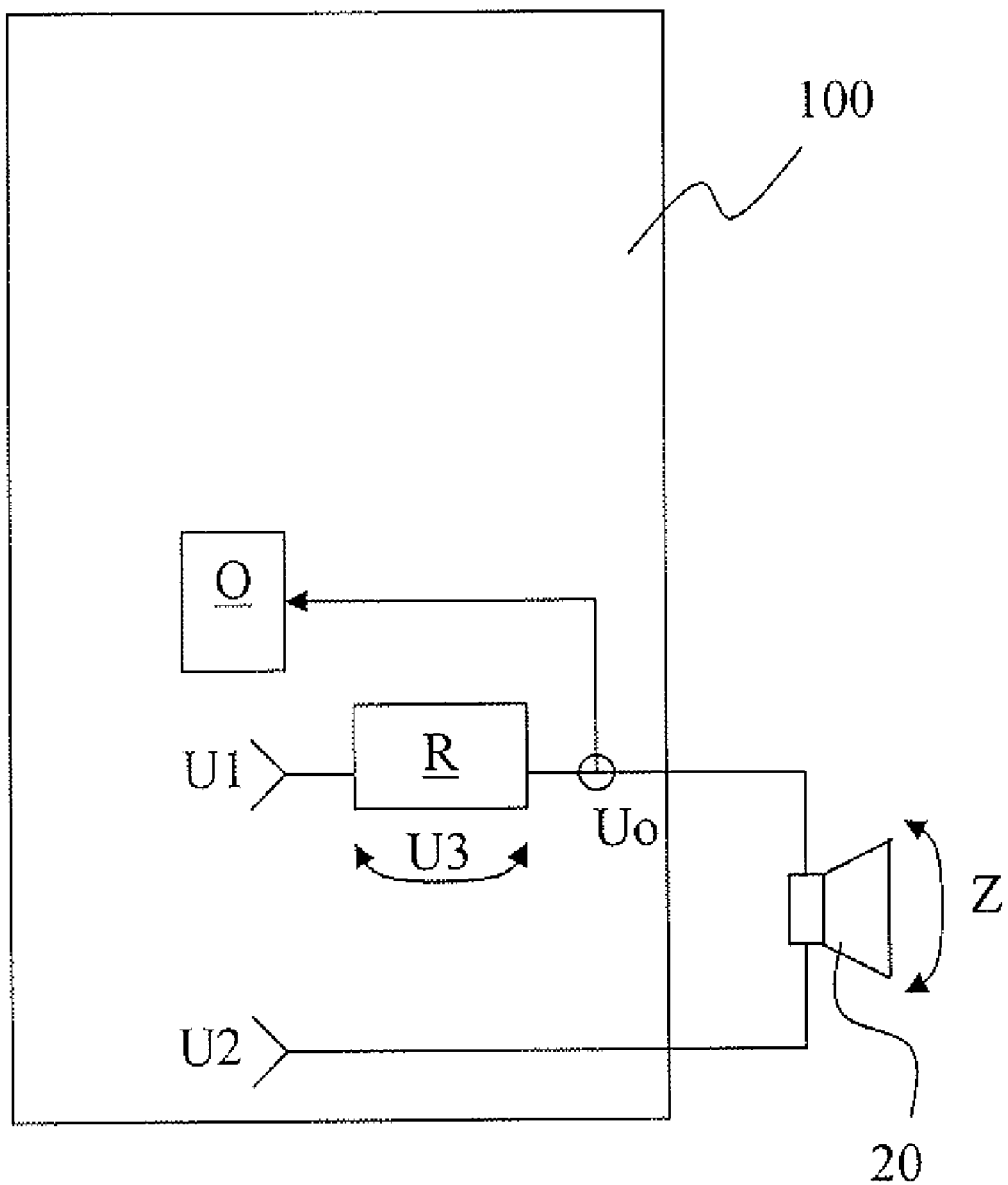
FIG. 2 shows a schematic overview of a measuring arrangement in an electronic arrangement.

In FIG. 2, a schematic overview of a measuring arrangement in an electronic arrangement 100 is shown.

The measuring arrangement may include a resistor R, for example, a shunt resistor, and a reading unit O arranged to read the measuring value after resistor R in order to determine the acoustic impedance Z over earphone arrangement 20. It should here be understood that the measured values indicate the electric impedance and the acoustic impedance is included into the electric impedance.

U3=R*I, Measured U3=U1−Uo; +known R gives: I=(U1−Uo)/R;
Hence, $$Z=(Uo-U2)/((U1-Uo)/R)$$

where,
U1=Voltage at point 1
U2=Voltage at point 2
U3=Voltage over the resistor
R=Resistor value of the resistor
Uo=Read voltage at point O It should be understood that the read value may be a different unit, such as current and/or the like.

The arranging of a shunt resistor to measure impedance Z may enable wireless electronic arrangement 100 to detect whether one or both earphones are in the ear(s) of user 2. Then, when it is determined that earphone arrangement 20 is in an active state, that is, in user 2's ear(s), the operational mode of wireless electronic arrangement 100 may be changed. For example, wireless electronic arrangement 100 may change from an operational mode using a speaker in wireless electronic arrangement 100 to an operational mode using the speaker(s) in earphone arrangement 20.

In some cases, the control unit, based on the determined state, may change the executing logic from a first logic to a second logic. The different operational modes may be, for example, to change from a logic that illuminates wireless electronic arrangement 100 when an incoming call is received to a logic that does not illuminate wireless electronic arrangement 100 to reduce power consumption when earphone arrangement 20 is in the ear, changing output speaker/vibrator arrangement, changing the execution of an application to pause the application, and/or the like.

The acoustic impedance may be the acoustic resistance the speaker gets from the surroundings, e.g., ambient noise. The electric impedance that is measured may include the electric impedance from a wire in the earphone arrangement and a component from the acoustic impedance.

Figure 3:
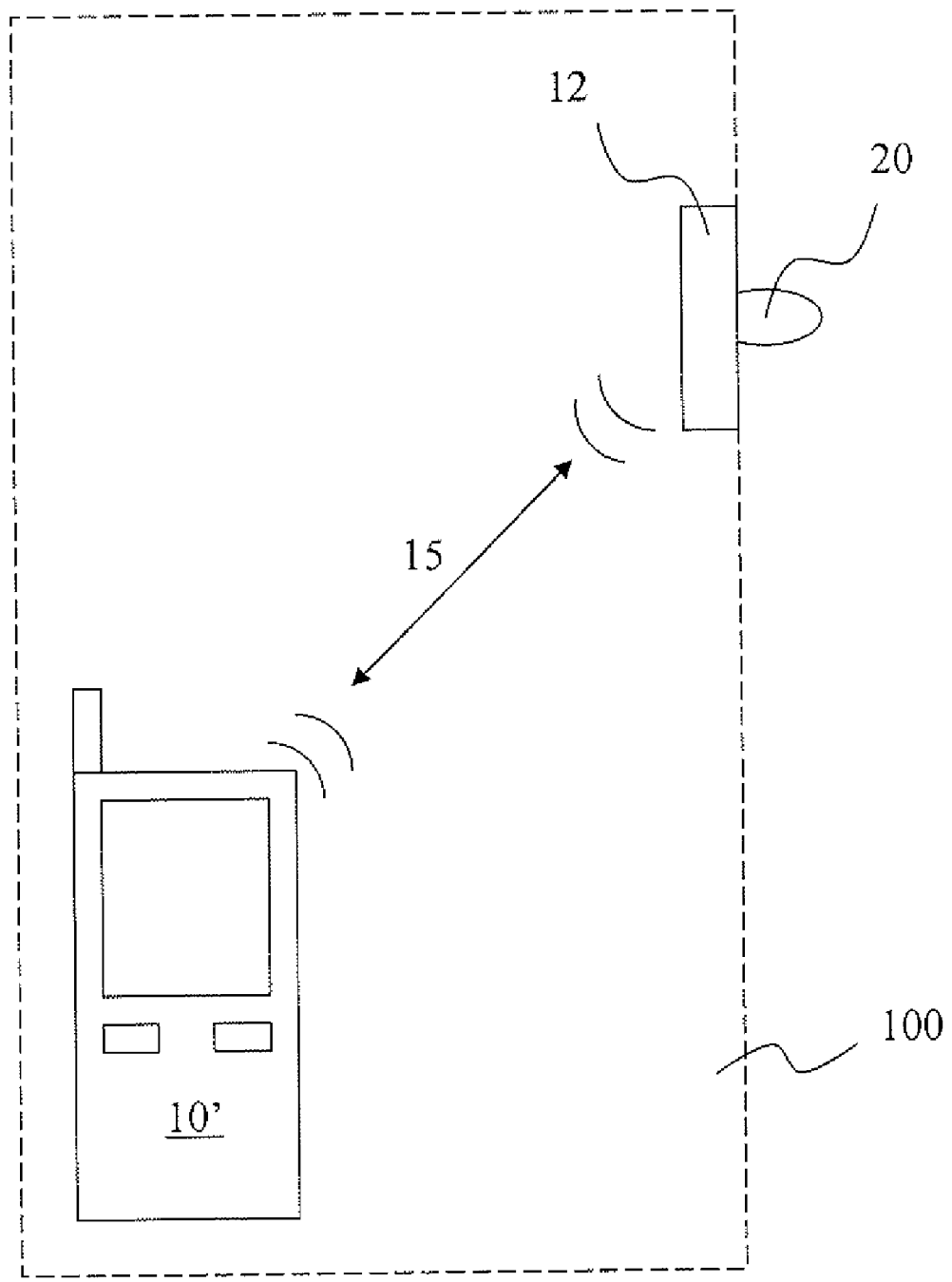
FIG. 3 shows a schematic overview of an embodiment of a wireless electronic arrangement.

In FIG. 3, a schematic overview of an embodiment of wireless electronic arrangement 100 is shown.

Wireless electronic arrangement 100 may include an intermediate device 12 wirelessly connected and communicating wirelessly 15 with a casing part 10' of wireless electronic arrangement 100, using Bluetooth® protocols, infra-red (IR), and/or the like.

Intermediate device 12 may include an electric signal generator that may generate low amplitude acoustic signals and a measuring arrangement that may be arranged to make measurements on the generated signals. Connected to intermediate device 12, may be earphone arrangement 20, and in order to determine whether casing unit 10' should generate sound when an incoming call is received or the sound should be generated in earphone arrangement 20, intermediate device 12 may perform a plurality of measurements on generated signals and compare the measured result with previously stored/measured values of previous signals. The comparing may be performed in intermediate device 12 and/or the control unit of casing unit 10'. Similarly, the control unit in casing unit 10' may determine, based on data sent from intermediate device 12, for example, measurement data, comparing impedance data, and/or the like, to change an operational mode of wireless electronic arrangement 100.

Intermediate device 12 may, in some embodiments, be include an adapter, a Bluetooth® headset, and/or other type of hands-free device.

Figure 4:
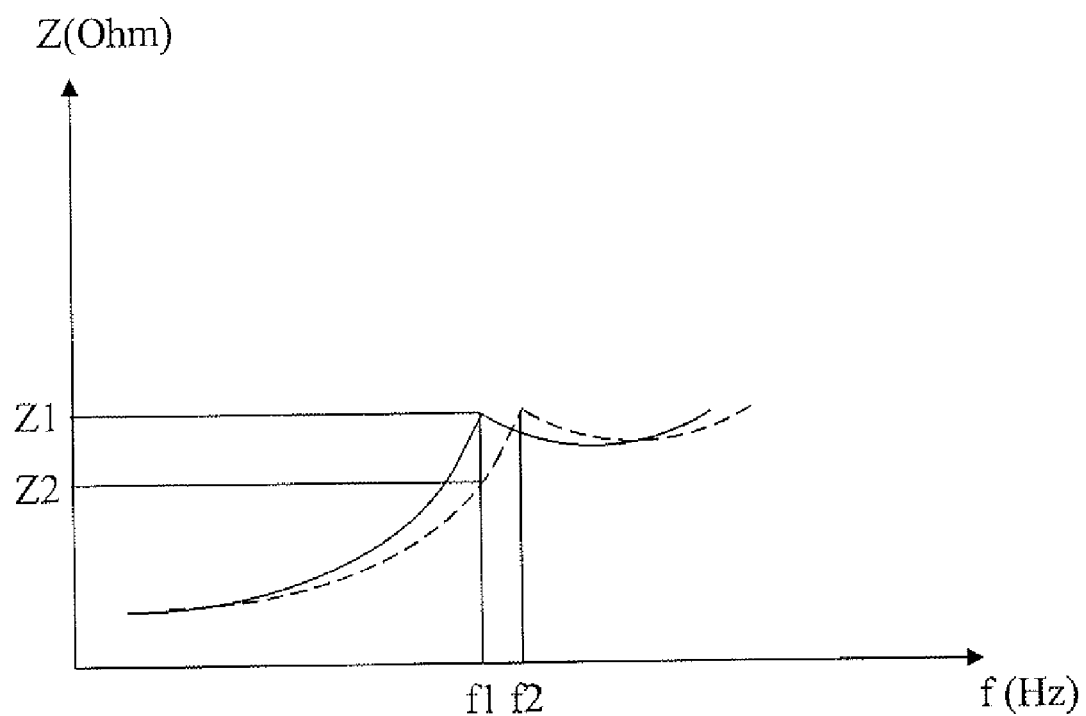
FIG. 4 shows a schematic overview of an impedance Z curve relative frequency f of a speaker.

In FIG. 4, a schematic overview of an impedance Z curve relative to frequency f of a speaker in earphone arrangement 20 is shown.

As shown, a first curve C1 illustrates the impedance change over different frequencies. A small impedance top Z1 is shown associated with a membrane of the speaker. The frequency of this impedance top is called resonance frequency f1 of the speaker. The electric impedance of the wire, etc., in the speaker may follow a linear curve and the top of the curve may be the addition of the acoustic impedance of the speaker.

As the volume around the speaker changes, the impedance of the speaker may change.

Wireless electronic arrangement 100 may be configured to generate a second electric acoustic signal and, based on measurements on the second signal, second impedance over the speaker of earphone arrangement 20 may be determined. The impedance Z over a speaker may change as the volume impinging the membrane of the speaker changes, and as the volume around the speaker gets smaller in the case of inserting it into an ear canal, the impedance curve C2 of the speaker may change. Hence, the resonance frequency may change and so may the impedance readings of different frequencies. In the illustrated embodiment, impedance Z1 of the first resonance frequency f1 may change to a second impedance value Z2 and the resonance frequency has changed to a second resonance frequency f2.

Hence, in some embodiments, in order to determine a current state of earphone arrangement 20, first impedance value Z1 may be compared to second impedance value Z2 of the same frequency, i.e., frequency f1. In some embodiments, second resonance frequency f2 may be determined and compared to first resonance frequency f1.

Based on the difference from the original values, that is, Z1 and/or f1, it may be determined whether the speakers of earphone arrangement 20 are inserted or not. In some embodiments, the Z and/or f values may have to differ by a threshold value, for example, at a minimum of 1, 2, 3, 4, 5, 6, 7, 8, 9, or 10 percent or more. Other threshold values may be used.

Wireless electronic arrangement 100 may include a mobile phone, a PDA, a wireless device with a wireless headset, a portable media player, and/or the like.

It should be noted that the first value may be set as a range of values, that is, the second value may need to be over a limit value or below a limit value in order for the operational mode to change.

It should be understood that the first value of the impedance may be, for example, predetermined from statistics taken of a number of different earphones in a testing facility, determined upon installation of the earphones whenever inserted, initiated by a user from a settings menu, and/or the like.

An installation guide may be run when wireless electronic arrangement 100 detects that earphone arrangement 20 has been plugged into, for example, a jack of wireless electronic arrangement 100, instructing user 2 to place earphone arrangement 20 on a surface with the membrane away from the surface and/or instructing user 2 to place earphone arrangement 20 into the ear(s). Hence, in some embodiments, the first (reference) value may be determined on earphone arrangement 20 not being used and, in some embodiments, the first (reference) value may be determined on earphone arrangement 20 being in position for use. It should also be understood that in some embodiments both worn (i.e., inserted) and not worn (i.e., not inserted) values may be used to determine the state of earphone arrangement 20.

In the embodiments in which wireless electronic arrangement 100 may determine the first impedance value, a first acoustic signal may be generated and sent through earphone arrangement 20. The first impedance may then be measured and stored. In some embodiments, a plurality of signals may be generated and impedances may be measured to determine an impedance curve and, from the curve, a resonance frequency may be determined. As the curve may be rather pointy around the resonance frequency, the difference of the impedance value may be readily determined to be the curve travels from the originating position around the resonance frequency.

In some embodiments, the difference of the first and second impedance may be determined by comparing the impedance values of the resonance frequency of the first signal. When the difference is more than a preset value, when the difference is determined as being outside a certain range, it may be determined that earphone arrangement 20 has been inserted and a change of operational mode may be preferred and is to be effected.

In some embodiments, the difference between the first and second impedances may be determined by comparing the resonance frequencies of the first and second signals.

Figure 5:
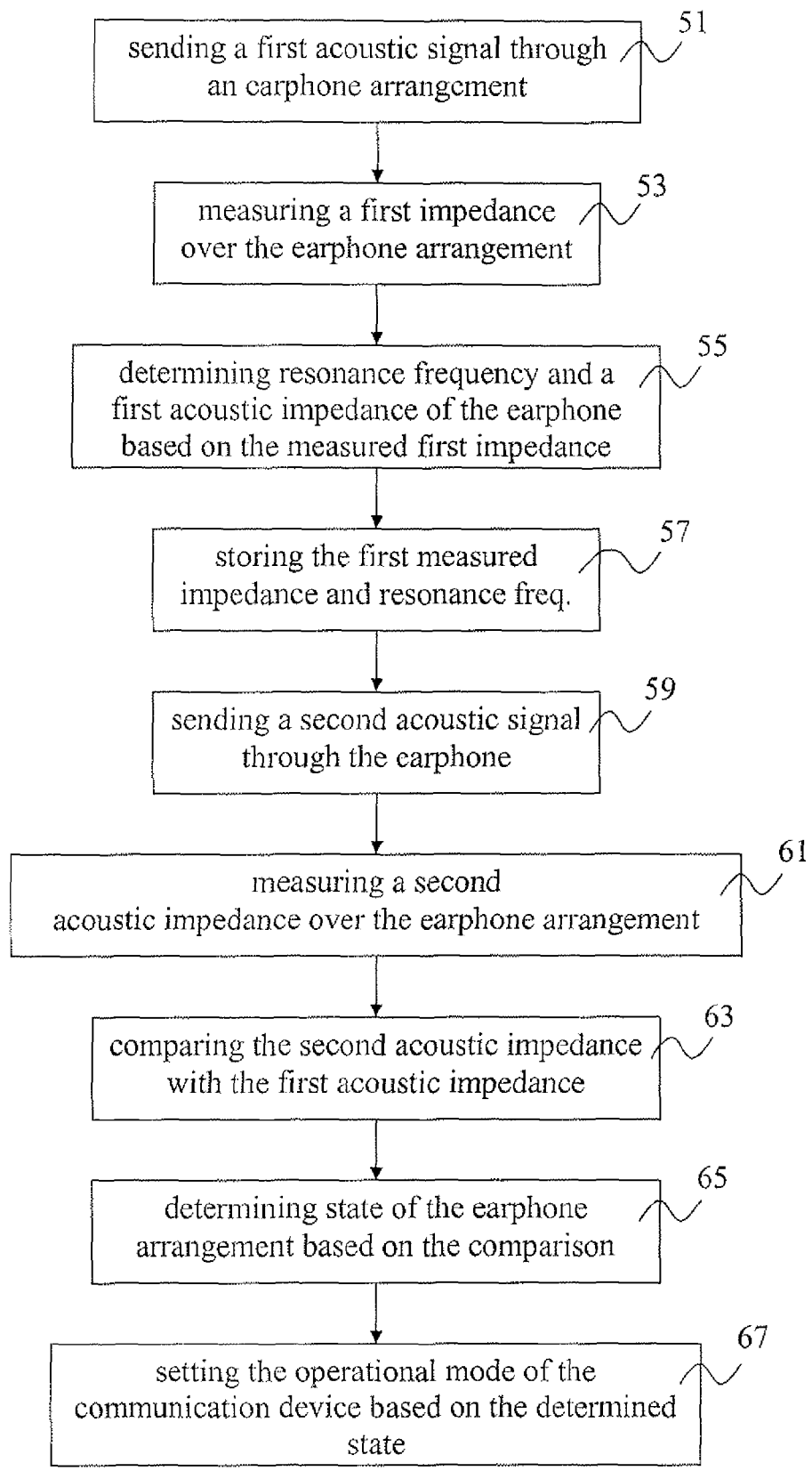
FIG. 5 shows a schematic overview of a method in a wireless electronic arrangement.

It should be understood that earphone arrangement 20 may, in some embodiments, include two earphones and it may be determined whether one or two of the earphones are inserted. This may be used to change to an operational mode using both the earphone and the internal speaker of electronic arrangement 100. In FIG. 5, a schematic overview of a method in wireless electronic arrangement 100 is shown.

In act 51, wireless electronic arrangement 100 may send a first electronic signal through earphone arrangement 20 connected to wireless electronic arrangement 100. This may be performed automatically as the earphones are plugged in, manually initiated, and/or the like.

In act 53, wireless electronic arrangement 100 may measure a first value indicating a first impedance over earphone arrangement 20. It should here be noted that the first value may be an electric measured value related to the first impedance of earphone arrangement 20, such as a current, a voltage, and/or the like.

In act 55, wireless electronic arrangement 100 may determine a first resonance frequency and/or a first acoustic impedance of earphone arrangement 20 based on the measured first value.

In act 57, wireless electronic arrangement 100 may store the first resonance frequency and/or the first acoustic impedance. It should here be understood that in some embodiments the first resonance frequency and/or the first acoustic impedance may include predetermined range values based on a plurality of tests performed on earphone arrangement 20 that are inserted during installation of a program in wireless electronic arrangement 100, such as when plugging earphone arrangement 20 into wireless electronic arrangement 100, and/or the like.

In act 59, wireless electronic arrangement 100 may send a second electric acoustic signal through earphone arrangement 20. The second electric signal may, in some embodiments, include a signal of very small amplitude and/or of the first resonance frequency.

It should be understood that wireless electronic arrangement 100 may be arranged to generate a plurality of signals to determine the resonance frequency of the second state of earphone arrangement 20.

In some embodiments, the second electric signal may be sent on an event basis, that is, triggered to be sent when certain criterion (a) is met, such as earphone arrangement is plugged into wireless electronic arrangement 100, an incoming call is received, a multimedia application is initiated, an accelerometer in a headset detecting movement, and/or the like. Consequently, a trigger command may be sent to the casing unit 10'. The second signal may also be continuously sent in a certain frequency, such as one signal every 15 seconds, manually activated from a menu, and/or the like.

In act 61, wireless electronic arrangement 100 may measure the generated signal resulting in a second value indicating a second acoustic impedance over earphone arrangement 20. The measured value may include a current, a voltage, or the like. In another embodiment, wireless electronic arrangement 100 may measure an air pressure, and/or any other detectable parameter, such as temperature, for instance, of earphone arrangement 20, and determine whether the parameter is within a predetermined range corresponding to disposition within the ear(s) of user 2.

In act 63, wireless electronic arrangement 100 may compare the second acoustic impedance with the first acoustic impedance.

In act 65, wireless electronic arrangement 100 may determine a state of earphone arrangement 20 based on the result of the compared impedances. Ear phone arrangement 20 may be configured to be in either of at least two operational states, an active mode and a non-active mode. The active mode may indicate that earphone arrangement 20 is in use, for example, inserted into an ear, and the non-active state may indicate that earphone arrangement 20 is not in use, for example, not in an ear.

In act 67, wireless electronic arrangement 100 may place itself in an operational state based on the determined state of earphone arrangement 20. For example, if earphone arrangement 20 is determined to be in an active state the operational mode may include activating functions in earphone arrangement 20, such as, output speaker and input microphone in earphone arrangement 20 and the corresponding functions in wireless electronic arrangement 100 may be switched off. If earphone arrangement 20 is determined to be in a non-active state, wireless electronic arrangement 100 may be set in an operational mode, effectively disregarding that earphone arrangement 20 is connected to wireless electronic arrangement 100, for example, such that a loud speaker(s) of wireless electronic arrangement renders an audible output.

In order to perform the above-described acts, wireless electronic arrangement 100 may be provided.

Figure 6:
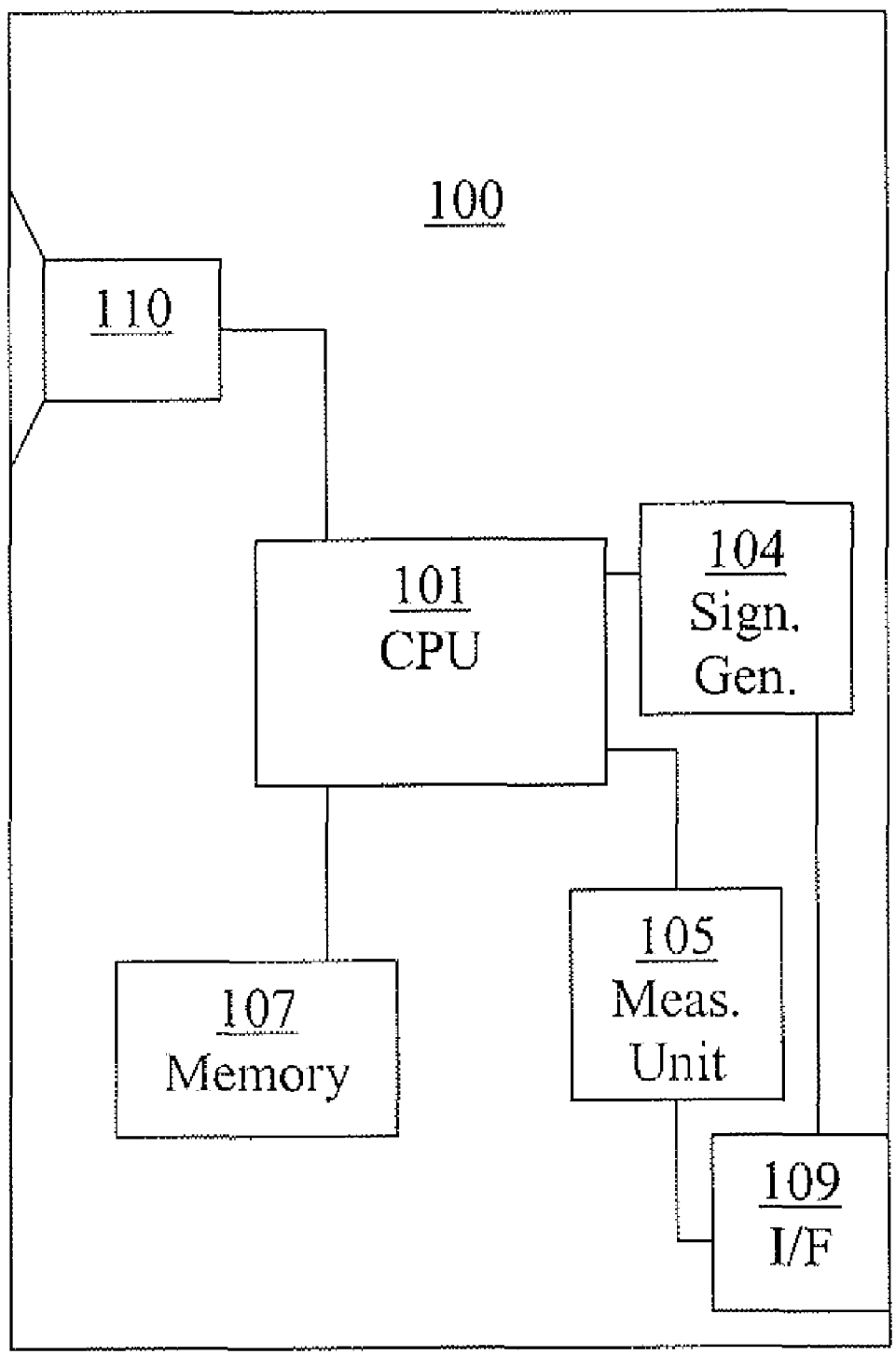
FIG. 6 shows a schematic overview of a wireless electronic arrangement.

In FIG. 6, a schematic overview of wireless electronic arrangement 100 is shown.

Wireless electronic arrangement 100 may include a mobile phone, a PDA, an MP3 player, a combined mobile phone and a Bluetooth® headset, and/or the like.

Wireless electronic arrangement 100 may be configured to detect a state of earphone arrangement 20 connected to wireless electronic arrangement 100. Earphone arrangement 20 may be enabled to be placed in one of at least two states, an active state and a non-active state. The active state may indicate that earphone arrangement 20 is in an ear or in a confined volume.

Wireless electronic arrangement 100 may include an electric signal generator 104 configured to generate a second electric signal, such as an electric acoustic signal of low amplitude or the like, to be sent over earphone arrangement 20. Wireless electronic arrangement 100 may include a measuring arrangement 105 configured to make at least one measurement on the second electric signal to determine a second value indicating a second acoustic impedance of earphone arrangement 20.

The triggering of generating the second acoustic signal may be a preset trigger state, such as initiation of a media application, detecting movement of earphone arrangement 20 or an intermediate device including an accelerometer, such as a Bluetooth® headset, an incoming call, connecting earphone arrangement 20 to wireless electronic arrangement 100, manually triggered by the user, and/or the like.

The second acoustic signal may also be generated continuously in a frequency, for example, every ten seconds all the time, as long as an application is running, and/or the like.

In addition, the wireless electronic arrangement comprises a control unit 101 arranged to compare the second value with a first value indicating a first acoustic impedance that may be stored on a memory unit 107, and based on the comparison to determine the state of earphone arrangement 20, in some embodiments, the first value and the second value may include an impedance value and/or a resonance frequency value.

In some embodiments, control unit 101 may be configured to determine the state of earphone arrangement 20 based on the range of difference between the first and the second values.

In some embodiments, the first value indicating the first acoustic impedance includes a predetermined impedance value stored in memory unit 107 based on a type of earphone arrangement 20. For example, certain types of earphones have a first value and other different earphones have a different first value. These values may be pre-programmed, transmitted, stored during installation of earphone arrangement 20 in wireless electronic device 100, and/or the like.

Control unit 101 may be configured to determine an operational mode of wireless electronic arrangement 100 based on the determined state of earphone arrangement 20. For example, when control unit 101 determines that earphone arrangement 100 is in an active state, loudspeakers in wireless electronic arrangement 100 may be turned off and/or muted, and a vibrator function and the speakers of earphone arrangement 20 may be activated. Other operational features associated with an operational mode may be to pause a media application when it is determined that earphone arrangement 20 is in a non-active state. Another associated feature may include a notifying signal, such as a ring signal or the like, may be controlled/sent to the loudspeaker when earphone arrangement 20 is in a non-active state and controlled/sent to earphone arrangement 20 when earphone arrangement 20 has been determined to be in an active state.

In some embodiments, electric signal generator 104 may be configured to generate a first electric signal to be sent to earphone arrangement 20 and measuring arrangement 105 may be configured to make measurements for control unit 101 to determine the first value indicating the first acoustic impedance of earphone arrangement 20.

This first measuring process may be arranged to make a plurality of measurements of a plurality of signals in order for control unit 101 to determine resonance frequency and acoustic impedance of the resonance frequency of the first electric signal.

Signal generator 104 may, in some embodiments, be arranged to send the second electric signal with a resonance frequency of a first electric signal.

Control unit 101 may be configured to determine a second resonance frequency based on the measurements and to compare the second resonance frequency with the first value indicating the first acoustic impedance wherein the first value indicates a first resonance frequency.

In some embodiments, such as a mobile phone with a Bluetooth® headset, measuring arrangement 105 and signal generator 104 may reside in a separate housing, an intermediate device, for example, the Bluetooth® headset or the like. The separated housing communicatively connect to control unit 101 for control unit 101 to determine an operational mode of wireless electronic arrangement 100.

Measuring arrangement 105 may include a resistor R, such as a shunt resistor, and a reading unit O, such as a voltage meter or the like.

In an overview of an exemplary method that may be performed by wireless electronic arrangement 100, the method may include a wireless electronic device 10 that may generate a second electric signal and send the second electric signal to earphone arrangement 20. The second electric signal may be measured and a second value indicating a second impedance of earphone arrangement 20 may be determined based on the measured value.

Wireless electronic arrangement 100 may compare the second value with a first value indicating a first impedance of earphone arrangement 20 and determine a state of earphone arrangement 20 based on a result of the comparison. Earphone arrangement 20 may be enabled to be in one of at least two states, an active state and a non-active state.

Based on the determined state of earphone arrangement 20, wireless electronic arrangement 100 may select an operational mode in which to operate.

In some embodiments, an exemplary method may include determining the first value indicating a first impedance of earphone arrangement 20, which may be determined by generating a first electronic signal and sending the first electronic signal to earphone arrangement 20. Wireless electronic arrangement 100 may measure a value of the first electric signal and determine the first value indicating the first impedance of earphone arrangement 20 based on the measured value.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

What is claimed is:

1. A wireless electronic arrangement to detect a state of an earphone arrangement connected to the wireless electronic arrangement, the wireless electronic arrangement comprising:
   an electric signal generator to generate an electric signal to be sent over the earphone arrangement;
   a measuring arrangement to make at least one measurement of the electric signal to determine a current acoustic impedance of the earphone arrangement; and
   a control unit to:
      compare the current acoustic impedance with a stored acoustic impedance,
      determine a state of the earphone arrangement based on a result of the comparison, and
      select an operational mode of the wireless electronic arrangement based on the determined state of the earphone arrangement.

2. The wireless electronic arrangement of claim 1, where the electric signal generator is further to generate a first electric signal to be sent over the earphone arrangement and the measuring arrangement is further to make at least one measurement of the first electric signal for the control unit to determine the first acoustic impedance of the earphone arrangement.

3. The wireless electronic arrangement of claim 2, where the measuring arrangement is further to make a plurality of measurements of a plurality of electric signals and the control unit is further to determine resonance frequency and acoustic impedance of the resonance frequency of the first electric signal.

4. The wireless electronic arrangement of claim 1, where the electric signal generator is to send the electric signal based on a predetermined trigger state.

5. The wireless electronic arrangement of claim 4, where the predetermined trigger state is a predetermined event at the wireless electronic arrangement of detecting movement in a headset using an accelerometer, the headset being connected to the earphone arrangement.

6. The wireless electronic arrangement of claim 1, where the electric signal generator is to generate the electric signal at a predetermined frequency.

7. The wireless electronic arrangement of claim 1, where the current acoustic impedance and the stored acoustic impedance correspond to at least a resonance frequency value.

8. The wireless electronic arrangement of claim 1, where the stored acoustic impedance includes a predetermined impedance value based on a type of the earphone arrangement.

9. The wireless electronic arrangement of claim 2, where the signal generator is further to send the electric signal with a resonance frequency of the first electric signal.

10. The wireless electronic arrangement of claim 1, where the control unit is further to determine a resonance frequency based on the at least one measurement and to compare the resonance frequency with a first resonance frequency associated with the stored acoustic impedance.

11. The wireless electronic arrangement of claim 1, where the measuring arrangement and the signal generator reside in a separate housing from a main casing including the control unit.

12. The wireless electronic arrangement of claim 1, where the measuring arrangement comprises a resistor and a reading unit.

13. The wireless electronic arrangement of claim 2, where the control unit is further to determine the state of the earphone arrangement based on a difference between the at least one measurement of the first electric signal and the at least one measurement of the electric signal.

14. The wireless electronic arrangement of claim 1, where a first state of the earphone arrangement corresponds to the earphone arrangement being disposed in a confined volume.

15. The wireless electronic arrangement of claim 1, where the wireless electronic arrangement resides in a mobile terminal.

16. In a wireless electronic arrangement connected to an earphone arrangement, the method comprising:
   generating an electric signal and sending the electric signal to the earphone arrangement;
   measuring a value of the electric signal at the earphone arrangement;
   determining a current impedance of the earphone arrangement based on the measured value;
   comparing the measured value with a stored value corresponding to an operational impedance of the earphone arrangement;
   determining an operating state of the earphone arrangement based on a result of the comparison; and
   determining an operational mode in which the wireless electronic arrangement is to operate based on the determined operating state of the earphone arrangement.

17. The method of claim 16, further comprising:

generating a first electric signal;

sending the first electric signal to the earphone arrangement;

obtaining the stored value of the first electronic signal; and determining the operational impedance of the earphone arrangement based on the stored value.

* * * * *